(12) United States Patent
Mudulodu et al.

(10) Patent No.: US 7,916,713 B2
(45) Date of Patent: Mar. 29, 2011

(54) METHOD AND SYSTEM FOR DETECTING A PRESENCE AND A START OF A ZONE IN A FRAME

(75) Inventors: Sriram Mudulodu, Santa Clara, CA (US); Louay Jalloul, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 871 days.

(21) Appl. No.: 11/888,256

(22) Filed: Jul. 31, 2007

(65) Prior Publication Data

US 2009/0034558 A1 Feb. 5, 2009

(51) Int. Cl.
*H04J 1/02* (2006.01)
(52) U.S. Cl. ......... 370/349; 370/350; 370/509; 370/522
(58) Field of Classification Search .......... 370/203–209, 370/252, 254, 255, 344, 349–350, 389, 392, 370/437, 471, 474, 480, 482, 484, 485, 486, 370/503, 509–514, 522
See application file for complete search history.

(56) References Cited

U.S. PATENT DOCUMENTS

| 2009/0252079 A1* | 10/2009 | Zhang et al. | ............. 370/315 |
| 2009/0303918 A1* | 12/2009 | Ma et al. | ............. 370/315 |

OTHER PUBLICATIONS

IEEE 802.16e Standard—2005. pp. 256-262, 323-330.*

* cited by examiner

*Primary Examiner* — Seema S Rao
*Assistant Examiner* — Mon Cheri S Davenport
(74) *Attorney, Agent, or Firm* — McAndrews, Held & Malloy, Ltd.

(57) ABSTRACT

The present invention provides methods and systems for detecting a start symbol of a second zone of a frame. One or more symbol indices corresponding to one or more symbols of the second zone of a frame are derived. One or more codes on pilot sub-carriers corresponding to the one or more symbol indices may also be derived. Based on the one or more symbol indices a set of possible start symbol indices is established. Thereafter, a frame is received comprising one or more of a preamble symbol, a first zone and the second zone. It is determined if the received frame comprises the second zone. If the second zone is present in the received frame, the start symbol index of the second zone of the received frame is determined based on the detection of one or more codes and the set of possible start symbol indices. The present invention further provides methods and systems for detecting a $N^{th}$ symbol of a frame.

17 Claims, 8 Drawing Sheets

METHOD AND SYSTEM FOR DETECTING A PRESENCE AND A START OF A ZONE IN A FRAME

FIELD OF INVENTION

The present invention relates generally to communication networks and more specifically to methods and systems for detecting a presence and a start symbol of a zone of a received frame.

BACKGROUND OF THE INVENTION

Multi-carrier or Orthogonal frequency division multiplexing (OFDM) systems have gained considerable attention in the last few years. They are increasingly used in various wireless applications and communication systems. For instance, IEEE 802.11a standard and IEEE802.16 d/e standard provide an OFDM mode of transmission. The 802.16 d/e standard also provides multiple access based on basic OFDM ideas using a mode called OFDMA (Orthogonal Frequency Division Multiple Access).

In OFDMA systems, data is transmitted in a frame comprising a plurality of symbols. A symbol is a collection of narrowband sub-carriers transmitted in parallel at different frequencies from a same source. Each individual sub-carrier transmits information by modulating the phase and possibly the amplitude of the sub-carrier Further, the frame in the OFDMA system can have multiple zones. For instance, OFDMA mode in IEEE 802.16e has a unicast zone and a Multicast and Broadcast Service (MBS) zone. Each zone comprises a group of symbols in the frame. Moreover, the frame comprises a preamble symbol for synchronizing with a receiver. The frame, also, comprises symbols in the unicast zone for communicating mapping information on a user's data bursts, known as downlink MAP (DL-MAP), to a receiver such as a mobile station. DL-MAP conveys information such as the presence of the MBS zone and the symbol index at which the MBS zone starts.

Generally, the plurality of symbols of the frame are received sequentially at the receiver. However, very often, the receiver may be interested in the data on a particular zone. For instance, the receiver may wish to decode data on the MBS zone, but not in the unicast zone. In some of the existing systems, the receiver may go into sleep or idle mode when it does not intend to transmit and receive any data for a particular time interval. During this time interval, almost all blocks of the receiver are shut down to reduce power consumption and hence the signals from the base stations are not being processed. However when it wakes up and intends to decode the MBS data, in existing implementations, it must first, necessarily, decode data in the unicast zone and then continue to decode the unicast zone over all frames until a frame with the MBS zone is encountered. In order to process the data in the unicast zone, the receiver performs many signal processing tasks such as channel estimation, frequency and timing synchronization, Quadrature Amplitude Modulation (QAM) demodulation, deinterleaving, channel decoding etc. These signal processing tasks consume power at the receiver.

SUMMARY OF THE INVENTION

An embodiment provides methods and systems for detecting a start symbol of a second zone of a frame.

Another embodiment provides methods and systems for detecting a $N^{th}$ symbol of a frame.

In an embodiment, a receiver can partially shut down while a first zone is being received, for instance a component of the receiver that decodes the received symbols can shut down while receiving the first zone. However, a component of the receiver that keeps track of the symbol timing may be functional, so as to keep a count of the symbol indices. The receiver can power up again when the second zone starts. This enables the receiver to reduce power consumption.

Embodiments described above comprise deriving one or more symbol indices corresponding to one or more symbols of the second zone of a frame. Further, one or more codes corresponding to one or more symbol indices may also be derived. The frame may be a frame previously received by the receiver. Based on the one or more symbol indices, a set of possible start symbol indices is established. Thereafter, a frame is received which may comprise one or more of a preamble symbol, a first zone and the second zone. It may be determined if the second zone is present in the frame, in accordance with an embodiment of the present invention. Further, if the second zone is present, a start symbol index of the second zone of the frame is determined based on the one or more codes and the set of possible start symbol indices.

Embodiments described above further comprise receiving a first frame comprising a scheduling map. The scheduling map is decoded to determine one or more of a start symbol index of the second zone of the first frame and a partial seed used to generate a plurality of scrambling codes for a plurality of symbols corresponding to the second zone of the first frame. When a second frame is received, a set of possible start symbol indices of the second frame are estimated. Further, a scrambling code for a first symbol index of the set of possible start symbol indices of the second frame is determined and it is detected whether the first symbol index is the start symbol index of the second zone of the second frame. If the first symbol index is not detected to be the start symbol index of the second zone of the second frame, then a second symbol index of the set of possible start symbol indices of the second frame is progressively selected until the start symbol index of the second zone of the second frame is detected. This way, the start symbol index of the second zone of the second frame is determined based on the start symbol index of the second zone of the first frame and/or the partial seed decoded from the scheduling map of the first frame.

Embodiments described above also comprise deriving one or more symbol indices corresponding to one or more symbols of a frame. The one or more symbol indices are derived for determining a $N^{th}$ symbol of the frame. For that purpose, one or more codes corresponding to the one or more symbol indices may also be derived. Based on the one or more symbol indices, a set of possible $N^{th}$ symbol indices is established. Thereafter, a frame may be received at the receiver. A $N^{th}$ symbol index of the received frame is determined based on the one or more codes and the set of possible $N^{th}$ symbol indices.

BRIEF DESCRIPTION OF THE FIGURES

A more complete appreciation of the present invention is provided by reference to the following detailed description when considered in conjunction with the accompanying drawings in which reference symbols indicate the same or similar components, wherein.

Figure 1:
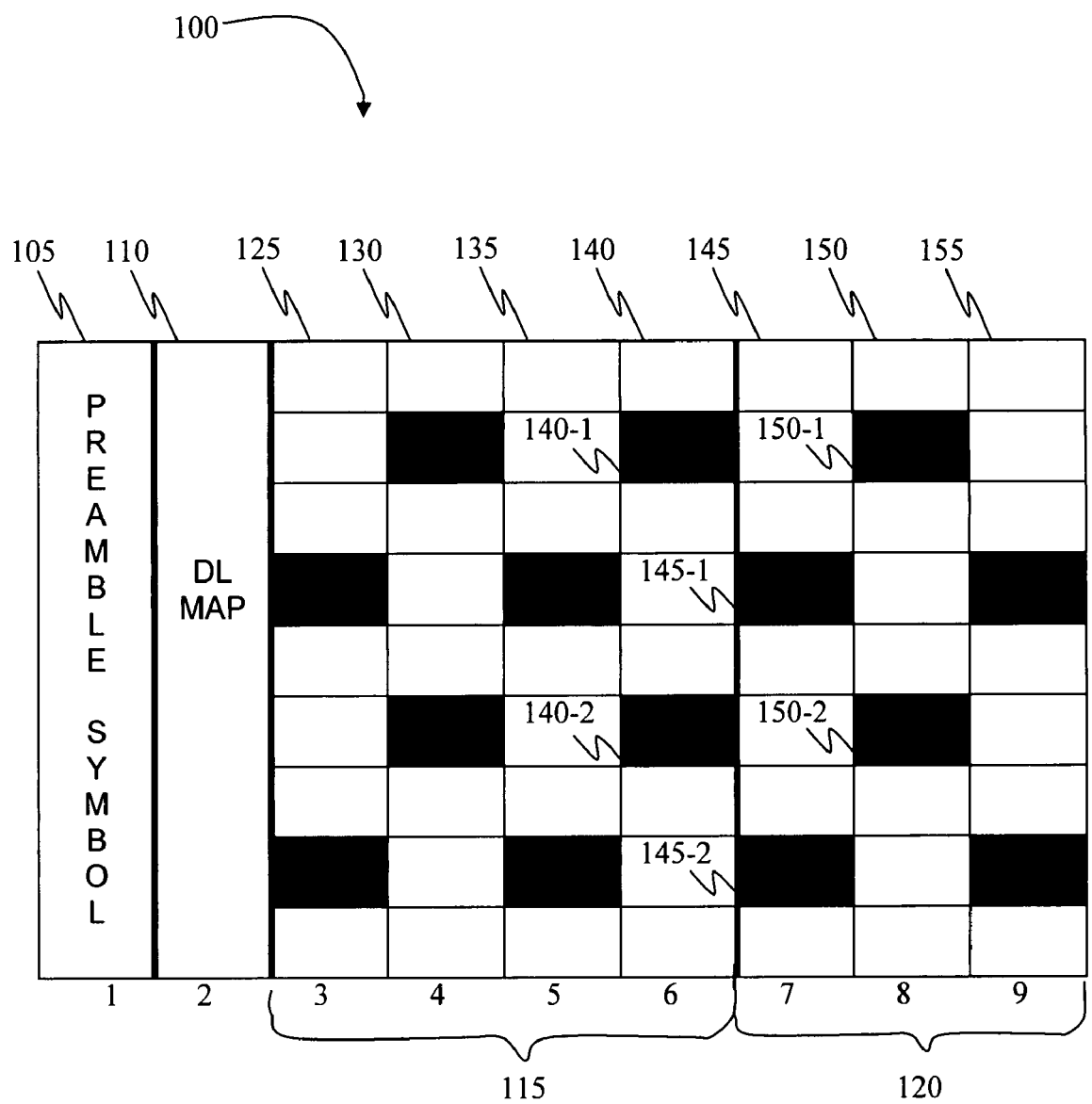
FIG. 1 illustrates an exemplary representation of a downlink sub-frame of a frame, in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the various embodiments.

DETAILED DESCRIPTION OF THE INVENTION

Before describing in detail embodiments that are in accordance with the invention, it should be observed that the embodiments reside primarily in combinations of method steps and apparatus components related to a method and system for detecting a presence and a start of a zone in a frame.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not comprise only those elements but may comprise other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of a method and system for detecting the presence and the start of a zone in a frame described herein. The non-processor circuits may include, but are not limited to, a radio receiver, a radio transmitter, signal drivers, clock circuits, power source circuits, and user input devices. As such, these functions may be interpreted as steps of methods and systems for detecting the presence and the start of a zone in a frame, described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides methods and systems for detecting the presence and the start of a zone in a frame in a communication system. Further, in an embodiment, methods for detecting $N^{th}$ symbol of the frame is also provided.

Referring now to the drawings, and in particular FIG. 1, an exemplary representation of a downlink sub-frame 100 of a frame is shown in accordance with various embodiments. A frame in a communication network, typically, comprises a downlink sub-frame, such as downlink sub-frame 100. A base station transmits packets to a mobile station on a downlink sub-frame.

In a multi-carrier communication system, a frame can have multiple zones. For instance, in an OFDMA system like WiMAX, a frame can have a unicast zone and a Multicast and Broadcast Service (MBS) zone. Those skilled in the art will realize that packets transmitted from a base station to a mobile station in the unicast zone, are specifically addressed to the mobile station. On the other hand, packets transmitted from a base station to a mobile station on the MBS zone, may be addressed to multiple mobile stations simultaneously.

Downlink sub-frame 100 is a representation of a downlink sub-frame in the multi-carrier communication system. Downlink sub-frame 100 comprises a preamble symbol 105. Preamble symbol 105 enables a base station to synchronize with a mobile station. Downlink sub-frame 100 may also comprise one or more symbols for a downlink MAP (DL-MAP) 110. Downlink sub-frame 100 may also include some symbols for an uplink MAP. DL-MAP 110 comprise mapping information, which informs a receiver about presence of a zone in the frame, a start of a certain zone in the frame, etc.

Downlink sub-frame 100 further comprises a first zone 115 and a second zone 120. In an OFDMA mode of IEEE802.16 d/e, first zone 115 can be the unicast zone and second zone 120 can be the MBS zone. First zone 115 and second zone 120 can each comprise a plurality of symbols. For instance, in accordance with FIG. 1, first zone 115 comprises a symbol 125, a symbol 130, a symbol 135 and a symbol 140, whereas, second zone 120 comprises a symbol 145, a symbol 150 and a symbol 155. Each symbol can further comprise a plurality of sub-carriers. One or more of these sub-carriers can be pilot sub-carriers. For instance, symbol 140 comprises a pilot sub-carrier 140-1 and a pilot sub-carrier 140-2. Similarly, symbol 145 comprises a pilot sub-carrier 145-1 and a pilot sub-carrier 145-2, symbol 150 comprises a pilot sub-carrier 150-1 and a pilot sub-carrier 150-2 and so on. It will be appreciated by those skilled in the art that locations of the pilot sub-carriers may differ in two or more symbols in downlink sub-frame 100. Further, those skilled in the art will realize that downlink sub-frame 100 may comprise any number of zones, and each zone may comprise any number of symbols. Further, each symbol may comprise any number of sub-carriers any number of pilot sub-carriers, and all such embodiments are within the scope of the present invention.

A receiver may be interested in receiving only the information embedded in second zone 120 of downlink sub-frame 100. In an embodiment, the receiver is facilitated to detect a symbol index corresponding to a start symbol of second zone 120, without having to decode DL-MAP 110 and first zone 115. The start symbol of second zone 120 in FIG. 1 is symbol 145. A method for detecting the start symbol of second zone 120 is explained in detail in conjunction with FIG. 2 and FIG. 3 below. Another method for detecting the start symbol of second zone 120 is explained in conjunction with FIG. 4 and FIG. 5 below.

Further, in yet another embodiment, a receiver can detect a symbol located at any symbol index. A method for detecting a $N^{th}$ symbol in the frame is explained in detail in conjunction with FIG. 6 and FIG. 7 below.

Figure 2:
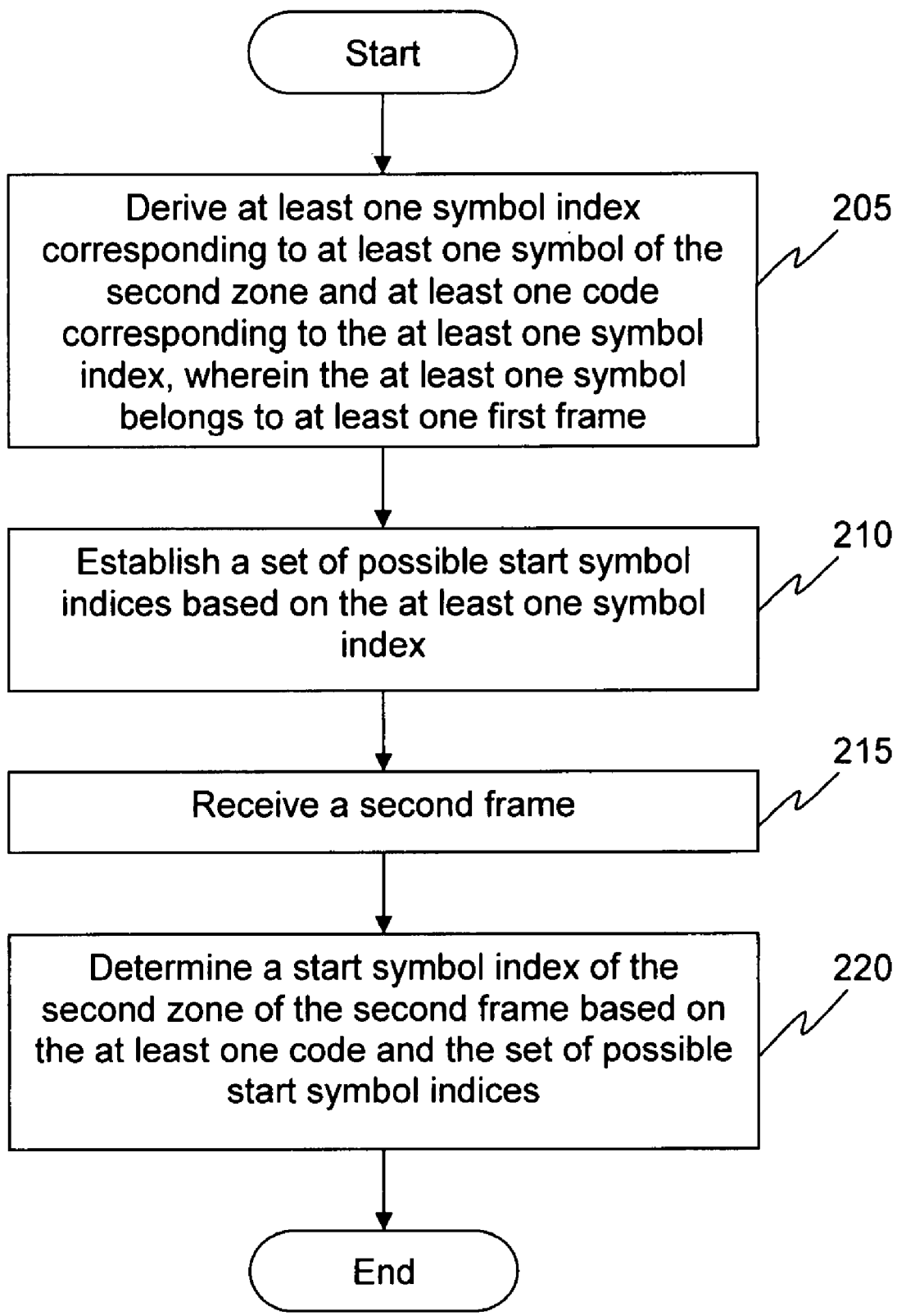
FIG. 2 illustrates a flow diagram for detecting a start symbol of a second zone of a frame, in accordance with an embodiment.

Turning now to FIG. 2, a flow diagram for detecting a start symbol of a second zone of a frame is shown in accordance with an embodiment. A receiver, typically, knows location of pilot sub-carriers in a symbol of a frame. For instance, the receiver receiving downlink sub-frame 100 may know that any symbol in a downlink sub-frame can comprise pilot sub-carriers at any of two sets of location. A first set of location comprises the pilot sub-carriers at the fourth and the eighth locations of a symbol and a second set of location comprises the pilot sub-carriers at the second and the sixth locations of a symbol. It shall be appreciated by those skilled in the art that a downlink sub-frame may comprise any number of sets of location for the pilot sub-carriers, and all such embodiments are in the scope of the present invention.

The receiver may further know the codes transmitted on pilot sub-carriers in each symbol of a frame. Consequently, the receiver may know that the locations of pilot sub-carriers can belong to a set of locations of the pilot sub-carriers, and the receiver may also know the codes transmitted on the pilot sub-carriers. An embodiment uses this information known to a receiver for determining the start symbol of second zone 120 of downlink sub-frame 100.

The receiver may not need to exactly or entirely know the set of locations corresponding to the pilot sub-carriers and the codes embedded in them. For instance, there may be certain errors in the code etc. However, it will be appreciated by those skilled in the art that this may not affect the applicability of the present invention.

Initially, one or more frames can be processed using conventional methods in order to derive required information, such as frame timing information for the frame and a possible start symbol index for the second zone and a code used to modulate pilot sub-carriers of the possible start symbol of the second zone. This information, typically, does not change each time a frame is received. Hence, this information may, hereinafter, be assumed to be known to the receiver. At 205, one or more symbol indices corresponding to one or more symbols of a second zone of a frame and/or one or more codes corresponding to the one or more symbol indices can be derived. The one or more symbols can belong to the second zone of the frame. Hence, for instance, the start symbol index of the second zone of the frame can be derived. However, in an embodiment, more than one symbol indices of the frame can be derived for better accuracy.

Further, a code transmitted on the pilot sub-carriers of the start symbol index can also be derived, at 205. It will be appreciated by those skilled in the art that a code, used to modulate pilot sub-carriers of a symbol, may be a function of a base station, a symbol index of the symbol, and a zone to which the symbol belongs. A base station serving a mobile station may change over time as the mobile station moves and hence the code may change for the same zone and the same symbol index. However, in the case of MBS zone in WiMax, oftentimes, even if the mobile station moves, the code may still remain a function of only the symbol index. Hence, a code used to modulate the pilot sub-carriers may be unique for each symbol of the second zone. Consequently, the receiver may know a possible start symbol index for the second zone and a code used to modulate the pilot sub-carriers of the possible start symbol of the second zone.

For instance, from the initial processing of the second zone, it may be derived that the start symbol index of the second zone is symbol index 7. Further, a code used to modulate the pilot sub-carriers of symbol at symbol index 7 may be derived at 205. Based on the derived start symbol index, a set of possible start symbol indices may be established at 210. The set of possible start symbol indices can comprise one or more symbol indices, such that the set of possible start symbol indices has a maximum index corresponding to the derived symbol index plus a predetermined number and a minimum index corresponding to the derived symbol index minus the predetermined number. The predetermined number can be determined based on a possible shift expected in the start symbol of the second zone.

For instance, referring back to an earlier example, if the derived start symbol index of the second zone is symbol index 7, then the set of possible start symbol indices may comprise symbol index 6, symbol index 7 and symbol index 8, where the predetermined number is 1. If the predetermined number is 2, then the set of possible start symbol indices can comprise symbol index 5, symbol index 6, symbol index 7, symbol index 8, and symbol index 9. Further, the set of possible start symbol indices can comprise any symbol indices, based on other algorithms, and all such embodiments are within the scope of the present invention.

After the initial processing of the second zone to derive required information, a frame can be received at 215. Downlink sub-frame 100 can correspond to the received frame. A start symbol index of the second zone of the received frame can be determined based on the required information derived from previous frames at 220. Consequently, once the required information is known, processing the entire frame in order to obtain information embedded only in the second zone is not required. A receiver may directly go to a start symbol location of the second zone and may partially shut down while the first zone is being received. This enables a receiver to reduce power consumption.

Further, if the receiver wakes up from the shut down mode, the receiver may lose track of where or in which frame the next second zone occurs. In accordance with the present invention, the receiver may not need to read DL-MAP 110 for every frame until the next occurrence of the second zone. Hence, performing channel estimation, synchronization and decoding of the data in DL-MAP 110 of all frames is obviated, thus reducing power consumption. Determining of the start symbol index of the second zone of the frame is described in detail in conjunction with FIG. 3 below.

Figure 3:
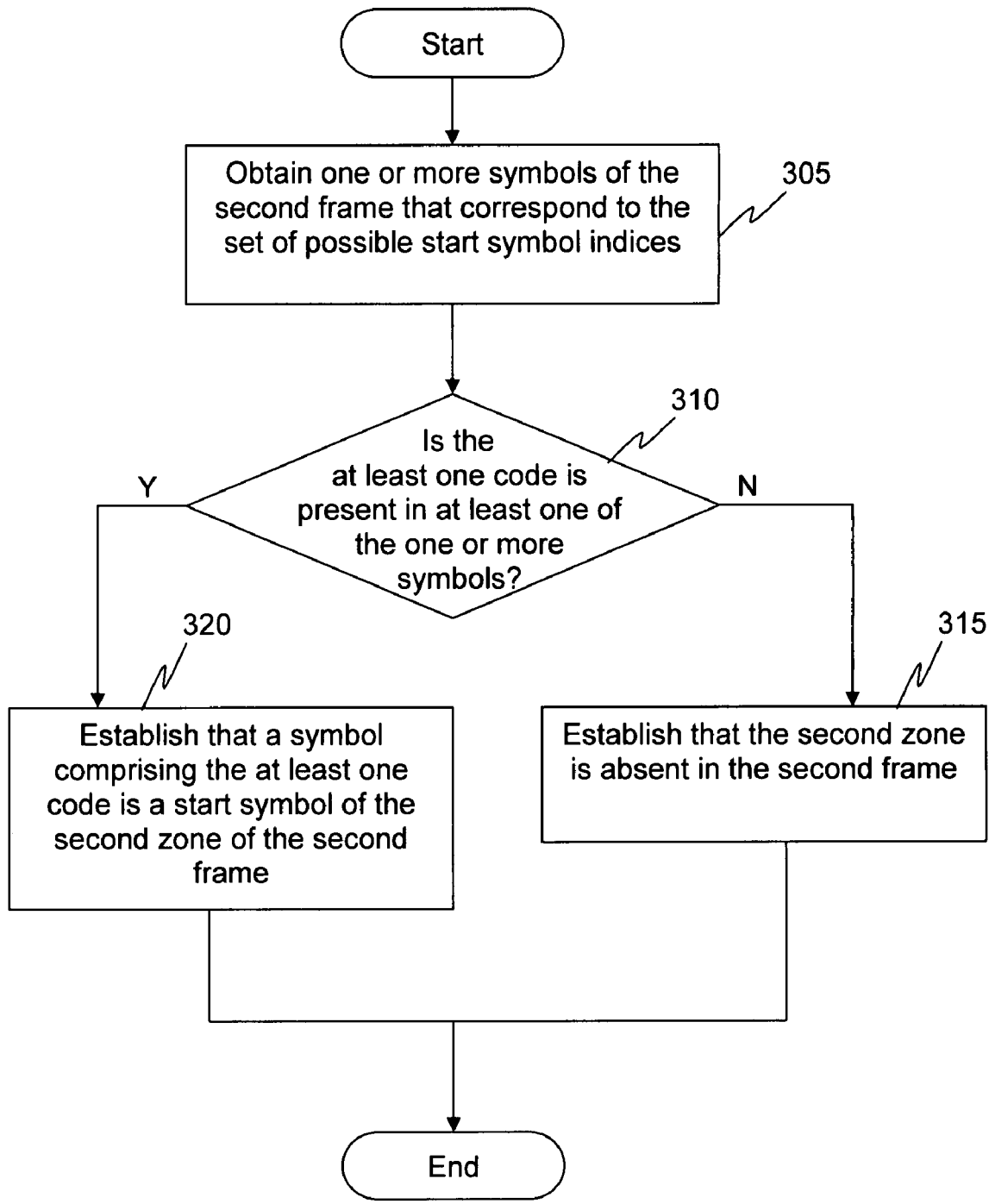
FIG. 3 illustrates a flow diagram for determining a start symbol index of a second zone, in accordance with an embodiment.

FIG. 3 is a flow diagram for determining a start symbol index of a second zone in accordance with an embodiment. As mentioned in conjunction with FIG. 2, required information, such as a set of possible start symbol indices and/or the codes used to modulate pilot sub-carriers of symbols with indices included in the set of possible start symbol indices, is derived from one or more frames. For instance, if the start symbol index of the second zone of a previous frame is symbol index 7, then the set of possible start symbol indices may comprise symbol index 6, symbol index 7 and symbol index 8. A start symbol index of the second zone of a frame, received at 215 of FIG. 2, is determined based on this required information.

For that purpose, one or more symbols of the frame received at 215, corresponding to the set of possible start symbol indices, are obtained at 305. Downlink sub-frame 100 may be considered to be a downlink sub-frame of the frame received at 215, for exemplary purposes. Consequently, symbol 140 corresponding to the symbol index 6, symbol 145 corresponding to the symbol index 7 and symbol 150 corresponding to the symbol index 8 are obtained at step 305.

In an embodiment, a receiver receiving downlink sub-frame 100 can partially shut down while a first zone is being received, for instance a component of the receiver that decodes the received symbols can shut down while receiving the first zone. However, a component of the receiver that keeps track of the symbol timing may be functional, so as to keep a count of the symbol indices. The receiver can power up again when the second zone starts. This enables the receiver to reduce power consumption, for instance, when the receiver is interested in second zone 120 and not in first zone 115.

Next, it is detected, at 310, if the code used to modulate the pilot sub-carriers of the start symbol of the second zone of the previous frame is present in any of symbol 140, symbol 145 and symbol 150 of downlink sub-frame 100. The presence of the code in a symbol may be detected using any of the conventional methods known in the art. For instance, the derived code may be correlated with codes on the pilot sub-carriers of symbol 140, symbol 145 and symbol 150. A successful detection may be declared, if a high correlation is obtained.

In an embodiment, for better reliability, indices of two or more symbols may be derived from the previous frame. Also, two or more codes corresponding to the pilot sub-carriers of the two or more symbols may be derived. In this embodiment, at 310, it is detected if the two or more codes are present in these symbols. This may improve the performance of detection. Further, the code may be detected in symbol 140, symbol 145 and symbol 150 until a successful detection or until detection in all of symbol 140, symbol 145 and symbol 150 is exhausted.

Further, if downlink sub-frame 100 does not comprise any symbols with indices belonging to the set of possible start symbol indices, then it may be established, at 315, that the second zone is absent in downlink sub-frame 100.

On the other hand, if, at 310, the code is detected in one of symbol 140, symbol 145 and symbol 150 of downlink sub-frame 100, then a symbol comprising the code is established as the start symbol of the second zone of downlink sub-frame 100, at 320. For instance, at 310, the code may be detected to have been transmitted on pilot sub-carrier 145-1 and pilot sub-carrier 145-2 of symbol 145. Hence, at 320, it may be established that symbol 145 is the start symbol of the second zone of downlink sub-frame 100.

Start symbol indices of any zone in a frame in a multi-carrier communication system may be determined using a method similar to that described in conjunction with FIG. 2 and FIG. 3 above.

Figure 4:
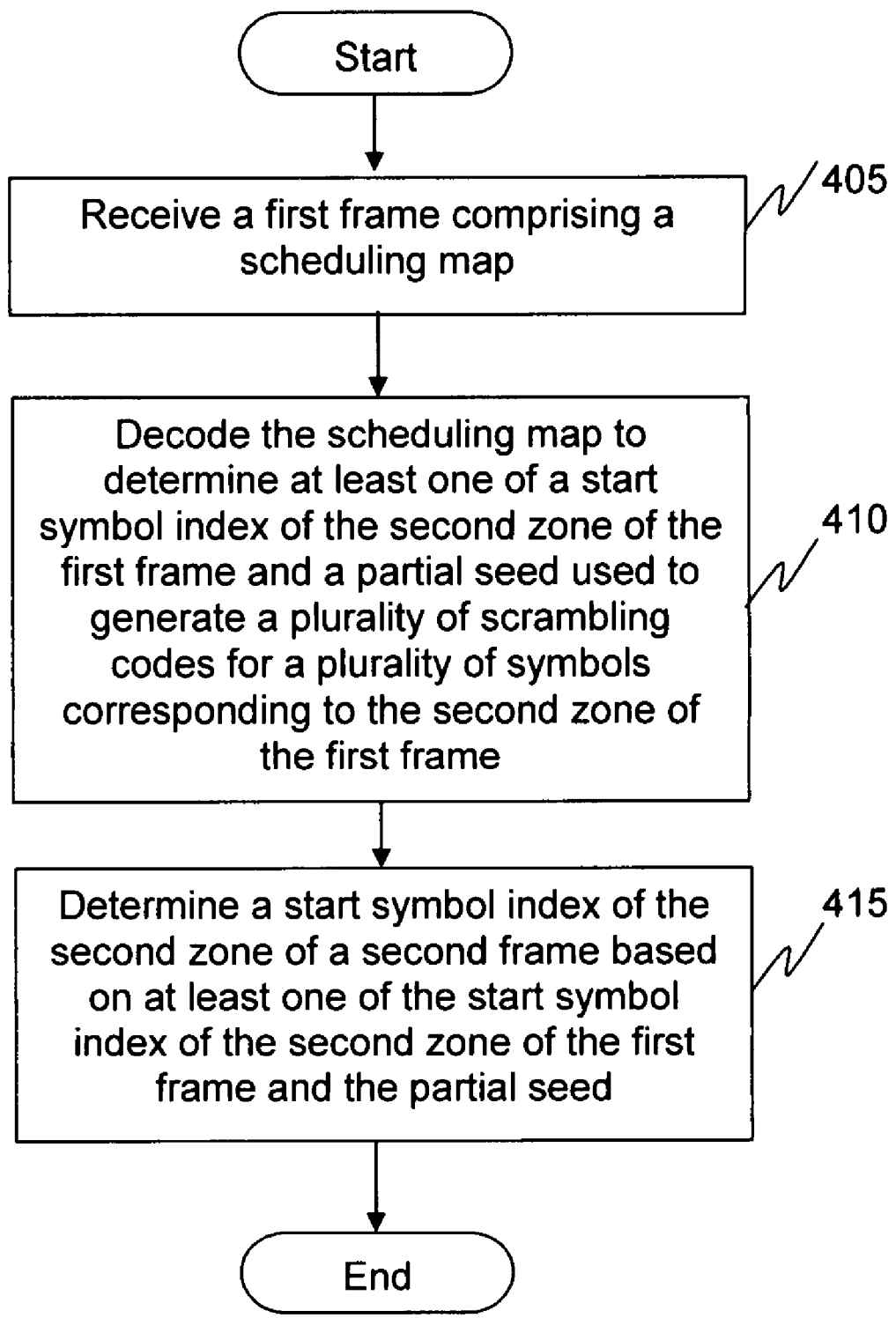
FIG. 4 illustrates a flow diagram for detecting a start symbol of a second zone of a frame in accordance with an embodiment.

Turning now to FIG. 4, a flow diagram for detecting a start symbol of a second zone of a frame is shown in accordance with an embodiment. The frame may comprise a preamble symbol, a first zone and a second zone. For instance, in a WiMax communication system, the first zone may be a unicast zone on which unicast data is transmitted and the second zone may be an MBS zone on which MBS data is transmitted. It may be desirable to detect a start symbol of the second zone in order to facilitate reduction in power consumption when only the data from the second zone is required. For instance, a receiver may be interested only in the MBS data. In this case, the present invention enables the receiver to detect a start symbol of the MBS zone, without having to decode the preamble symbol or the unicast zone.

Initially, a first frame is received at 405. The first frame comprises a scheduling map. The scheduling map includes information such as a start symbol index of the start symbol of each zone in the frame, a partial seed used to generate a plurality of scrambling codes to encode a plurality of symbols of the frame, etc.

Consequently, at 410, the scheduling map is decoded to determine the start symbol index of the second zone of the first frame and/or a partial seed used to generate the plurality of scrambling codes for a plurality of symbols corresponding to the second zone of the second frame. The information determined from the scheduling map of the first frame may be used to determine a start symbol index of the second zone of a second frame received from the same transmitter. The second frame may be a frame received subsequent to the first frame.

Further, in an embodiment, a scrambling code corresponding to the start symbol of the second zone of the first frame is determined. Using this scrambling code, a start symbol of the second zone of the subsequent frame may be determined without the need to decode a scheduling map of the subsequent frame.

In an embodiment, the scrambling code is a function of the start symbol index of the second zone of the second frame and the partial seed obtained from the scheduling map of the first frame. Consequently, the receiver can determine if a symbol index, belonging to the set of possible start symbol indices, is indeed the start symbol index of the second zone of the second frame. A symbol index in the set of possible start symbol indices may be determined to be the start symbol index of the second zone of the second frame, if the scrambling code is detected on a symbol corresponding to the start symbol.

At 415, the start symbol index of the second zone of the second frame is determined based on one or more of the start symbol index of the second zone of the second frame and the partial seed. Determining the start symbol index of the second zone of the second frame is described in detail in conjunction with FIG. 5 below.

Figure 5:
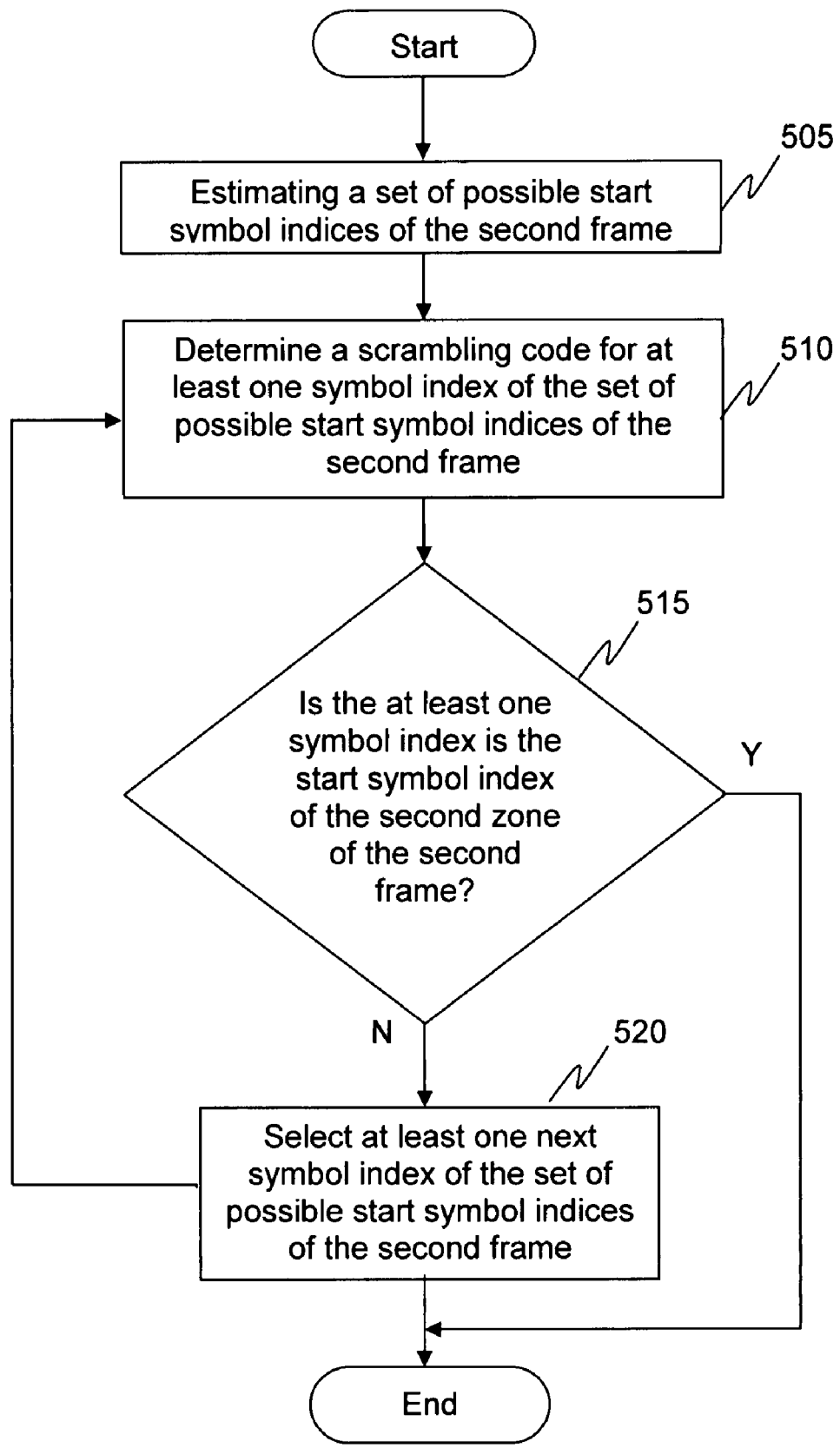
FIG. 5 illustrates a flow diagram for determining a start symbol index of the second zone of a second frame in accordance with an embodiment.

Turning now to FIG. 5, a flow diagram for determining a start symbol index of the second zone of a second frame is shown in accordance with an embodiment. As mentioned earlier, the second frame may be a frame received subsequent to receiving the first frame. Further, the information determined from the scheduling map of the first frame is used to determine the start symbol index of the second zone of the second frame.

For this purpose, a set of possible start symbol indices of the second frame is estimated at 505. The set of possible start symbol indices are the candidates of the start symbol index of the second zone of the second frame. The method of estimating the set of possible start symbol indices is described in detail in conjunction with FIG. 2 above.

Next, a scrambling code for first symbol corresponding to a first symbol index in the set of possible start symbol indices is determined at 510. At 515, it is detected whether the first symbol index is the start symbol index of the second zone of the second frame. In an embodiment, the detection may be done by comparing the scrambling code of the start symbol index of the second zone of the first frame with the scrambling code of the first symbol index in the set of possible start symbol indices. In another embodiment, the scrambling code can be detected by correlating the scrambling code of the first symbol index in the set of possible start symbol indices with the scrambling code of the start symbol index of the second zone of the second frame, and comparing the result with a threshold.

If the first symbol index is not detected to be the start symbol in index of the second zone of the second frame, then a second symbol index is selected, at 520, from the set of possible start symbol indices. A scrambling code for the second symbol index in then determined at 510 and it is checked if the second symbol index is the start symbol index of the second zone of the second frame at 515. This process progressively continues until the start symbol index of the second zone of the second frame is detected in the set of possible start symbol indices.

If the start symbol index of the second zone of the second frame is not detected in the set of possible start symbol indices, it may be determined that the second zone is absent in the second frame.

It will be appreciated by those with ordinary skill in the art, that a start symbol index of the second zone of any subsequent frames received in the communication system may be determined in a similar manner.

Figure 6:
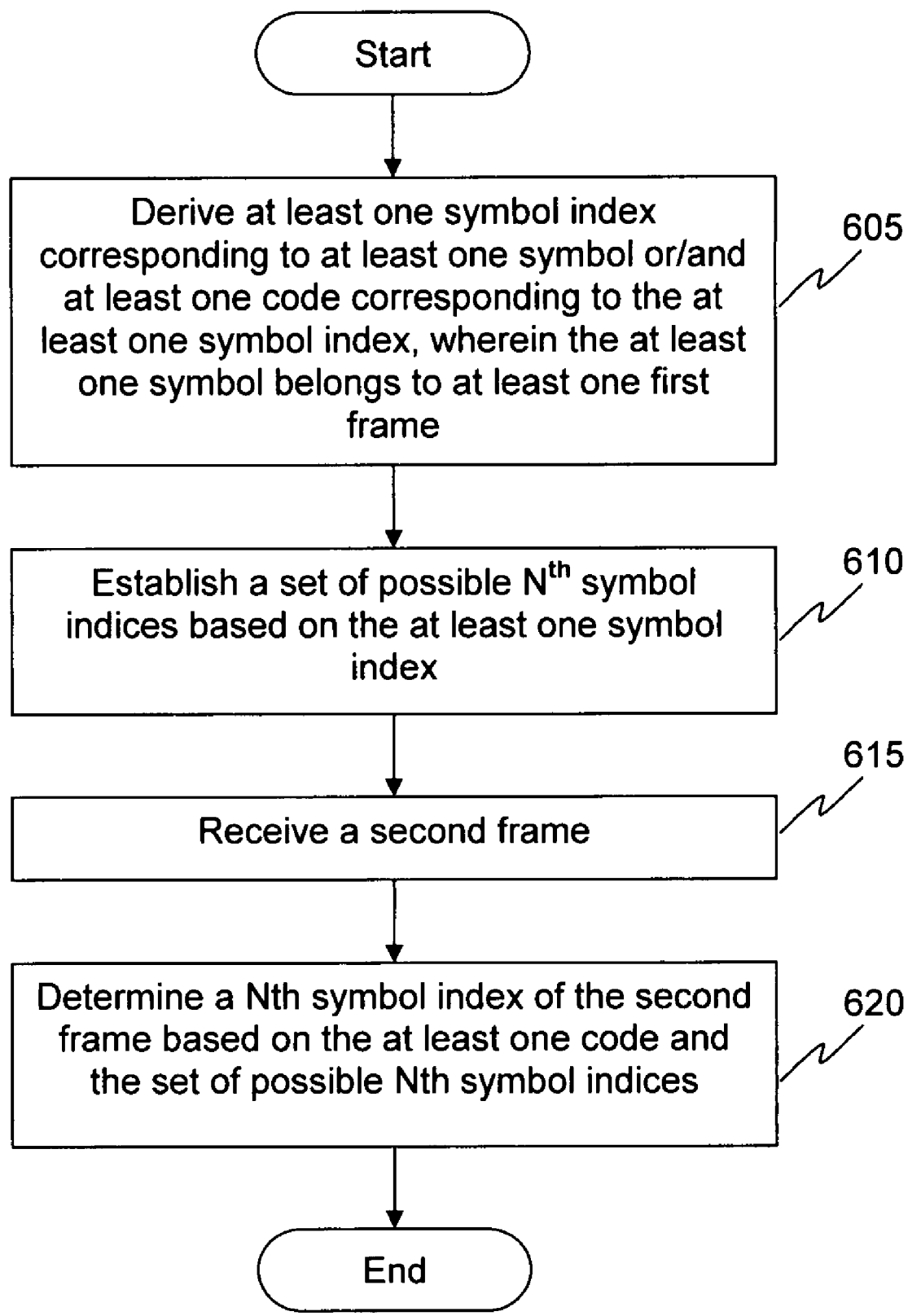
FIG. 6 illustrates a flow diagram detecting a $N^{th}$ symbol of a frame, in accordance with an embodiment.

Turning now to FIG. 6, a flow diagram for detecting a $N^{th}$ symbol of a frame is shown in accordance with an embodiment. $N^{th}$ symbol can be any symbol in a frame. Initially, processing of a frame may be done using conventional methods and a symbol index of a symbol of the frame may be derived, at 605. Also, frame timing information for the frame and a code used to modulate pilot sub-carriers of the symbol may be derived, at 605. For a new frame, there is a high probability that the derived code is present in a symbol of the new frame with the symbol index derived at 605. Hence, a set of possible $N^{th}$ symbol indices is established, at 610, based on the symbol index derived at 605. For example if N=8, the set of possible $8^{th}$ symbol indices may comprise symbol index 7, symbol index 8 and symbol index 9.

A frame, with downlink sub-frame 100, is received at 615. A $N^{th}$ symbol index corresponding to downlink sub-frame 100 is then determined, at 620, based on the code derived at 605 and the set of possible $N^{th}$ symbol indices. In an embodiment, the receiver may jump directly to a symbol of downlink sub-frame 100 corresponding to the $N^{th}$ symbol index determined at 620. The method of determining the $N^{th}$ symbol index is described in detail in conjunction with FIG. 7 below.

Figure 7:
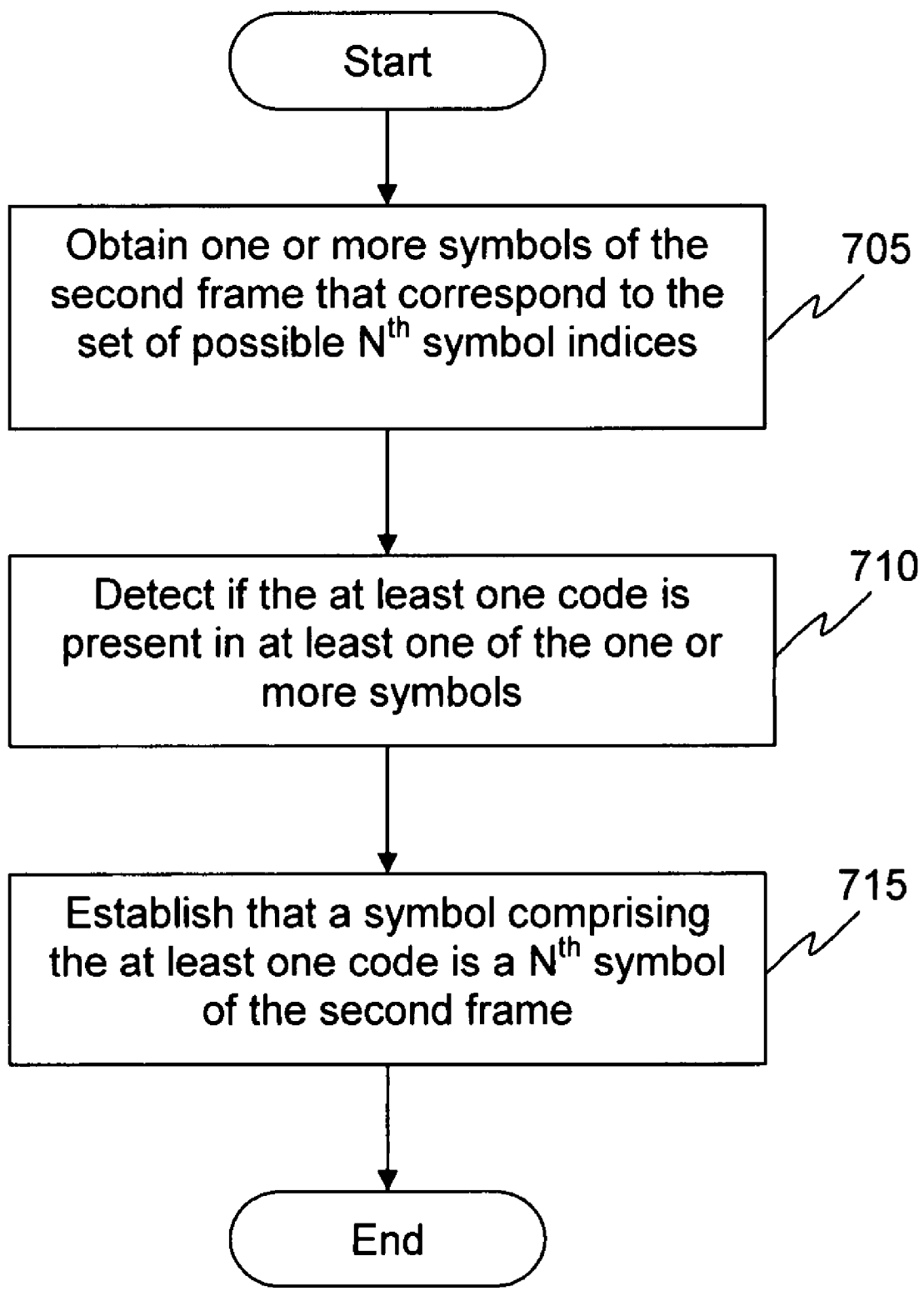
FIG. 7 illustrates a flow diagram for determining a $N^{th}$ symbol index of a frame, in accordance with an embodiment.

FIG. 7 is a flow diagram for determining a $N^{th}$ symbol index of a frame in accordance with an embodiment. As mentioned in conjunction with FIG. 6, information, such as a set of possible $N^{th}$ symbol indices and/or the codes used to modulate pilot sub-carriers of symbols with indices included in the set of possible start symbol indices, is derived from one or more frames. For instance if N=8, the set of possible $8^{th}$ symbol indices may comprise symbol index 7, symbol index 8 and symbol index 9. However, the number of symbol indices in the set of possible $N^{th}$ symbol indices may be configurable. A $N^{th}$ symbol index of a frame, received at 615 of FIG. 6, is determined based on this information.

For that purpose, one or more symbols of the frame received at 615, corresponding to the set of possible $N^{th}$ symbol indices, are obtained at 705. Downlink sub-frame 100 may be considered to be a downlink sub-frame of the frame received at 715, for exemplary purposes. Consequently, symbol 145 corresponding to the symbol index 7, symbol 150 corresponding to the symbol index 8 and symbol 155 corresponding to the symbol index 9, are obtained at step 705.

In an embodiment, the receiver may partially shut down while symbols before symbol index 7 are being received. The receiver may power up when a symbol with a symbol index belonging to the set of possible $N^{th}$ symbol indices is received. This enables the receiver to reduce power consumption.

Next, it is detected, at 710, if the code used to modulate the pilot sub-carriers of the $N^{th}$ symbol of the previous frame is present in any of symbol 145, symbol 150 and symbol 155 of downlink sub-frame 100. In an embodiment, for better reliability, indices of two or more symbols may be derived from the previous frame. Two or more codes corresponding to the pilot sub-carriers of the two or more symbols may also be derived. In this embodiment, at 710, it is detected if the two or more codes are present in the these symbols.

If, at 710, the code is detected in one of symbol 145, symbol 150 and symbol 155 of downlink sub-frame 100, then a symbol comprising the code is established as the symbol corresponding to the $N^{th}$ symbol of previous frame, at 715. For instance, at 710, the code may be detected to have been transmitted on pilot sub-carrier 150-1 and pilot sub-carrier 150-2 of symbol 150. Hence, at 715, it may be established that symbol 150 of downlink sub-frame 100 is the symbol corresponding to the symbol index 8 of a previous frame.

Figure 8:
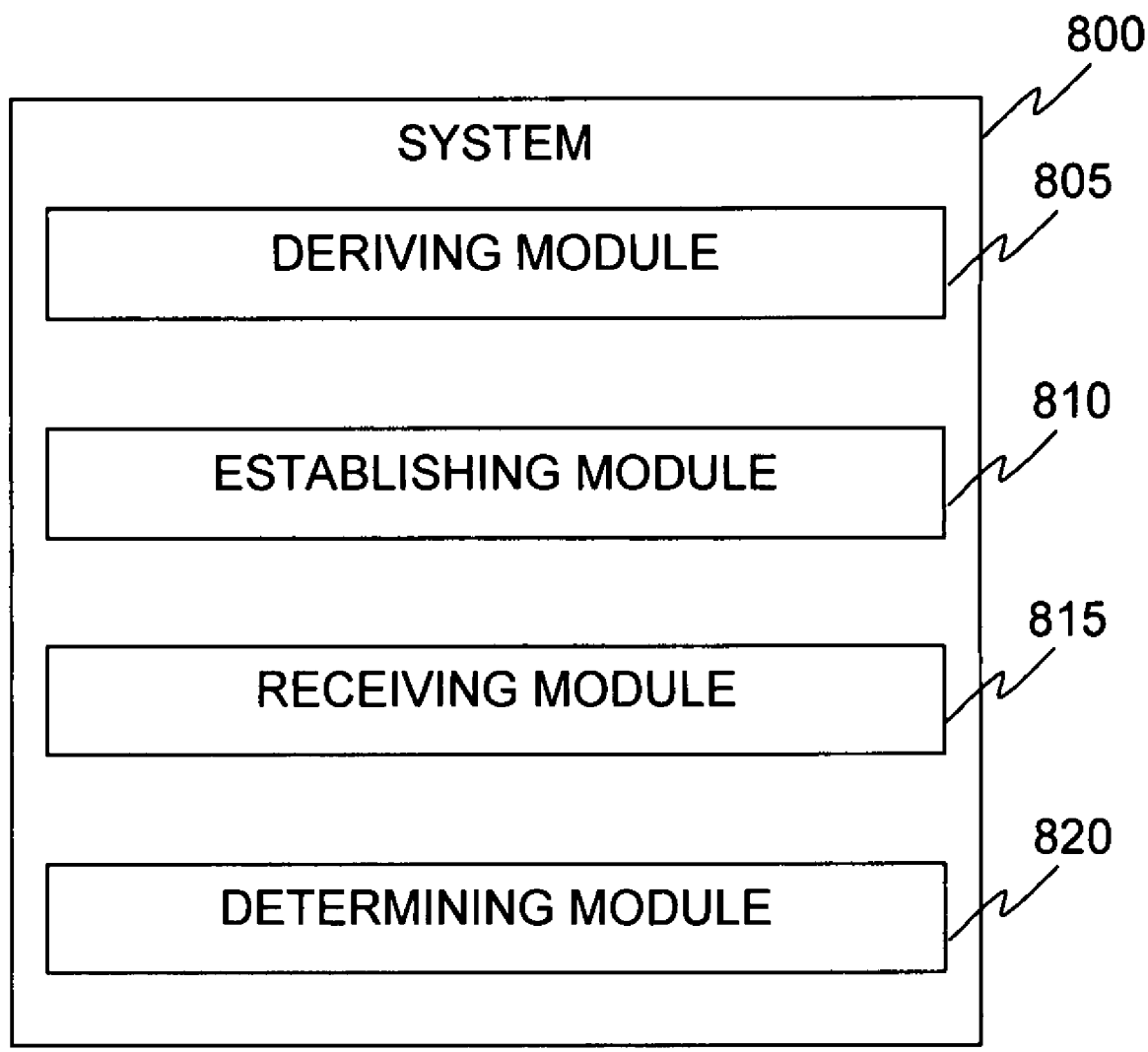
FIG. 8 illustrates a block diagram of a system for detecting a $N^{th}$ symbol of a frame, in accordance with an embodiment.

Turning now to FIG. 8, a block diagram of a system 800 for detecting a $N^{th}$ symbol of a frame is shown in accordance with an embodiment. System 800 comprises a deriving module 805, an establishing module 810, a receiving module 815 and a determining module 820. System 800 may reside on a receiver, such as a communication device, in a communication system. Deriving module 805, establishing module 810, receiving module 815 and/or determining module 820 of system 800 can be coupled 2 and/or connected in any of a variety of combinations as appropriate to the receiver, and are thus not limited to the configuration shown in FIG. 8.

As mentioned earlier, processing of a frame may be done using convention methods initially and deriving module 805 may derive a symbol index of a symbol of the frame. Further, deriving module 805 can derive a code used to modulate pilot sub-carriers of the symbol. In an embodiment, deriving module 805 can derive indices of two or more symbols from a frame. Two or more codes corresponding to the pilot sub-carriers of the two or more symbols may also be derived by deriving module 805. Further, deriving module 805 may also be configured to derive frame timing information of the frame.

For a new frame, there is a high probability that the derived code is present in a symbol with the derived symbol index in the new frame. Hence, establishing module 810 establishes a set of possible $N^{th}$ symbol indices, based on the symbol index determined. For example if N=8, establishing module 810 may establish the set of possible $8^{th}$ symbol indices such that the set of possible $8^{th}$ symbol indices comprises symbol index 7, symbol index 8 and symbol index 9. It will be appreciated by those skilled in the art that establishing module 810 can be configured to include any number of symbol indices in the set of possible $N^{th}$ symbol indices.

Next, receiving module 815 receives a frame, with downlink sub-frame 100. Determining module 820 determines a $N^{th}$ symbol index corresponding to downlink sub-frame 100, based on the code derived by deriving module 805 and the set of possible $N^{th}$ symbol indices established by establishing module 810.

In order to determine the $N^{th}$ symbol index in downlink sub-frame 100, determining module 820 is configured for obtaining one or more symbols of the frame received at receiving module 815, corresponding to the set of possible $N^{th}$ symbol indices. Downlink sub-frame 100 may be considered to be a downlink sub-frame of the frame received at receiving module 815, for exemplary purposes. Consequently, symbol 145 corresponding to the symbol index 7, symbol 150 corresponding to the symbol index 8 and symbol 155 corresponding to the symbol index 9 are obtained by determining module 820.

Next, determining module 820 detects if the code derived by deriving module 805 is present in any of symbol 145, symbol 150 and symbol 155 of downlink sub-frame 100. In an embodiment, for better reliability, deriving module 805 derives two or more codes instead of just one code from one or more previous frames. In this embodiment, determining module 820 detects if the two or more codes are present in a group of 2 or more symbols that have first symbol index in this group, belonging to the set of possible $N^{th}$ symbol indices. Determining module 820 may detect the presence of the code in a symbol by using any of the conventional methods known in the art. For instance, determining module 820 may correlate the derived code with codes on the pilot sub-carriers of symbol 145, symbol 150 and symbol 155. A successful detection may be declared, if a high correlation is obtained.

If determining module 820 detects the code in one of symbol 145, symbol 150 and symbol 155 of downlink sub-frame 100, then determining module 820 establishes that a symbol comprising the code as the symbol corresponding to the $N^{th}$ symbol of previous frame. For instance, determining module 820 may detect the code to be transmitted on pilot sub-carrier 150-1 and pilot sub-carrier 150-2 of symbol 150. Consequently, determining module 820 may establish that symbol 150 of downlink sub-frame 100 is the symbol corresponding to the symbol index 8 of the previous frame.

Those skilled in the art will realize that the $N^{th}$ symbol of a frame can be a start symbol of a second zone of a frame. In this case, system 800 is configured to detect a start or a presence of the second zone of a frame in a similar manner as described above.

Various embodiments described above provide methods and systems for detecting a start symbol of a second zone of a frame. Further methods and systems for detecting a $N^{th}$ symbol of a frame are also provided. In accordance with some embodiments, a receiver may not need to decode DL MAP symbols of a first zone, if the receiver is only interested in the second zone of the frame. This enables the receiver to partially shut down while receiving the first zone of the frame. The receiver can power up when that second zone starts. This enables reduction of power consumption at the receiver.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of a receiver detecting a start symbol of a second zone in a frame, wherein the frame comprises at least one of a preamble symbol, a first zone and the second zone, the method comprising:

the receiver deriving at least one of, at least one symbol index corresponding to at least one symbol of the second zone and at least one code corresponding to the at least one symbol index, the at least one symbol belonging to a plurality of symbols in the second zone of at least one first frame, the at least one code corresponding to at least one pilot sub-carrier of the at least one symbol;

the receiver establishing a set of possible start symbol indices based on the at least one symbol index;

the receiver receiving a second frame, the second frame comprising at least one of the preamble symbol, the first zone and the second zone; and determining a start symbol index of the second zone of the second frame based on the at least one code and the set of possible start symbol indices.

2. The method of claim 1, wherein the determining step comprises:

obtaining one or more symbols of the second frame that correspond to the set of possible start symbol indices;

detecting if the at least one code is present in at least one of the one or more symbols;

establishing that a symbol comprising the at least one code is a start symbol of the second zone of the second frame, if the at least one code is present in at least one of the one or more symbols, the symbol belonging to the one or more symbols, the start symbol index of the second zone of the second frame corresponding to the start symbol of the second zone of the second frame.

3. The method of claim 2, wherein if the at least one code is absent in the one or more symbols of the second frame, establishing that the second zone is absent in the second frame.

4. The method of claim 1, wherein the set of possible start symbol indices comprises one or more symbol indices with a maximum index corresponding to the at least one symbol index plus a predetermined number and a minimum index corresponding to the at least one symbol index minus the predetermined number.

5. The method of claim 1, wherein the first zone is a unicast zone and the second zone is a Multicast and Broadcast Service (MBS) zone.

6. The method of claim 1 further comprises initiating at least one of a channel estimation process and a synchronization process corresponding to the second zone, in response to determining the start symbol index of the second zone of the second frame.

7. A method of a receiver detecting a start symbol of a second zone of a frame, the frame comprising at least one of a preamble symbol, a first zone and the second zone, the method comprising:

the receiver receiving a first frame, the first frame comprising a scheduling map;

the receiver decoding the scheduling map to determine at least one of a start symbol index of the second zone of the first frame, and a partial seed used to generate a plurality of scrambling codes for a plurality of symbols corresponding to the second zone of the first frame; and the receiver determining a start symbol index of the second zone of a second frame based on at least one of the start symbol index of the second zone of the first frame and the partial seed.

8. The method of claim 7, wherein the determining step comprises:

estimating a set of possible start symbol indices of the second frame, wherein the set of possible start symbol indices are estimated as candidates of the start symbol index of the second zone of the second frame;

determining a scrambling code for at least one first symbol index of the set of possible start symbol indices of the second frame; and detecting whether the at least one first symbol index is the start symbol index of the second zone of the second frame.

9. The method of claim 8, wherein if the at least one first symbol index is not detected to be the start symbol index of the second zone of the second frame, then progressively selecting at least one second symbol index of the set of possible start symbol indices of the second frame until detecting the start symbol index of the second zone of the second frame.

10. The method of claim 9, wherein if the start symbol index of the second zone of the second frame is not detected, in response to progressively selecting each symbol index of the set of possible start symbol indices, then determine that the second zone is absent in the second frame.

11. A method of a receiver detecting a $N^{th}$ symbol of a frame, the method comprising:

the receiver deriving at least one of, at least one symbol index corresponding to at least one symbol and at least one code corresponding to the at least one symbol index, the at least one symbol belonging to at least one first frame, the at least one code corresponding to at least one pilot sub-carrier of the at least one symbol;

the receiver establishing a set of possible $N^{th}$ symbol indices based on the at least one symbol index;

the receiver receiving a second frame; and the receiver determining a $N^{th}$ symbol index of the second frame based on the at least one code and the set of possible $N^{th}$ symbol indices.

12. The method of claim 11, wherein the determining step comprises:

obtaining one or more symbols of the second frame that correspond to the set of possible $N^{th}$ symbol indices;

detecting if the at least one code is present in at least one of the one or more symbols;

establishing that a symbol comprising the at least one code is a $N^{th}$ symbol of the second frame, the symbol belonging to the one or more symbols, the $N^{th}$ symbol index of the second frame corresponding to the $N^{th}$ symbol of the second frame.

13. The method of claim 11, wherein the set of possible $N^{th}$ symbol indices comprises one or more symbol indices with a maximum index corresponding to the at least one symbol index plus a predetermined number and a minimum index corresponding to the at least one symbol index minus the predetermined number.

14. A receiver system for detecting a $N^{th}$ symbol of a frame, the receiver system comprising:

a deriving module, the deriving module deriving at least one of, at least one symbol index corresponding to at least one symbol and at least one code corresponding to the at least one symbol index, the at least one symbol belonging to at least one first frame, the at least one code corresponding to at least one pilot sub-carrier of the at least one symbol;

an establishing module, the establishing module establishing a set of possible $N^{th}$ symbol indices based on the at least one symbol index;

a receiving module, the receiving module receiving a second frame; and a determining module, the determining module configured for determining a $N^{th}$ symbol index of the second frame based on the at least one code and the set of possible $N^{th}$ symbol indices.

15. The system of claim 14, wherein the determining module is further configured for:

obtaining one or more symbols of the second frame that correspond to the set of possible $N^{th}$ symbol indices;

detecting if the at least one code is present in at least one of the one or more symbols;

establishing that a symbol comprising the at least one code is a $N^{th}$ symbol of the second frame, the symbol belonging to the one or more symbols, the $N^{th}$ symbol index of the second frame corresponding to the $N^{th}$ symbol of the second frame.

16. The system of claim 14, wherein the second frame comprises at least one of a preamble symbol, a first zone and a second zone.

17. The system of claim 16, wherein the $N^{th}$ symbol index of the second frame is a start symbol of the second zone of the second frame.

* * * * *